(12) United States Patent
Liu et al.

(10) Patent No.: US 11,726,860 B2
(45) Date of Patent: Aug. 15, 2023

(54) INTELLIGENT AUTOMATIC SUPPORT

(71) Applicant: EMC IP Holding Company LLC, Hopkinton, MA (US)

(72) Inventors: Weiyang Liu, Shanghai (CN); Qi Wang, Shanghai (CN); James Morton, Adamstown, MD (US); Lihui Su, Shanghai (CN); Ming Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 120 days.

(21) Appl. No.: 17/133,283

(22) Filed: Dec. 23, 2020

(65) Prior Publication Data

US 2022/0197725 A1 Jun. 23, 2022

(51) Int. Cl.
 *G06F 11/07* (2006.01)
(52) U.S. Cl.
 CPC ...... *G06F 11/0793* (2013.01); *G06F 11/0706* (2013.01); *G06F 11/079* (2013.01)
(58) Field of Classification Search
 CPC . G06F 11/0706; G06F 11/079; G06F 11/0793
 See application file for complete search history.

(56) References Cited

U.S. PATENT DOCUMENTS

| | | | | |
|---|---|---|---|---|
| 6,745,350 B1* | 6/2004 | Cline | ................. | G06F 11/0715 |
| | | | | 714/38.14 |
| 8,069,374 B2* | 11/2011 | Panigrahy | ............. | G06F 11/079 |
| | | | | 714/39 |
| 9,471,594 B1* | 10/2016 | Schnegelberger | .. | G06F 11/0706 |
| 9,529,662 B1* | 12/2016 | Wangkhem | ......... | G06F 11/0709 |
| 10,379,934 B2* | 8/2019 | Vedurumudi | ....... | G06F 11/0784 |
| 11,157,390 B2* | 10/2021 | Acharyya | ........... | G06F 11/3624 |
| 2012/0239971 A1* | 9/2012 | Mcmahan | ........... | G06F 11/0793 |
| | | | | 714/15 |
| 2022/0035693 A1* | 2/2022 | Jiang | ....................... | G06F 9/541 |

\* cited by examiner

*Primary Examiner* — Joseph R Kudirka
(74) *Attorney, Agent, or Firm* — Womble Bond Dickinson (US) LLP

(57) ABSTRACT

A knowledge base record can include executable language. Executing of the instructions of the record can include at least one of: a) searching for one or more terms in a log file associated with a data processing system; b) performing an API call; or c) getting or setting a field in a configuration file or database. The instructions can be executed to determine whether an issue is present with the data processing system, or to take corrective action.

20 Claims, 6 Drawing Sheets

INTELLIGENT AUTOMATIC SUPPORT

TECHNICAL FIELD

Embodiments of the present disclosure generally relate to automated support for a product. In particular, embodiments of the disclosure relate to a system that provides automated support for data processing systems.

BACKGROUND

Data has been recognized as an important asset for businesses today. Data can be stored on servers which can be cloud-based or reside in a local network. Backup for data can be stored in back up servers. Problems can arise with data processing systems. For example, software can unexpectedly crash, back-ups can fail, data writes and reads can fail, hardware can behave unpredictably, and other unwanted behavior can occur. Support (e.g., a technical specialist or customer service representative) typically troubleshoots a data processing system to determine the cause, and/or apply a fix or patch. To successfully troubleshoot, technical support relies heavily on personal experience and information.

Further, users (e.g., customers) typically do not appreciate the feeling of uncertainty. Thus, it may be desirable to provide alert notifications to a user. In existing systems, when an issue is found, e.g. an environmental problem or misusage of the product, the user is typically not given notification.

In addition, a similar or the same problem may have already been identified and solved, for example, with a different customer. If a solution already exists, then customer experience can be improved if the solution could be automatically applied, without human intervention which can introduce substantial delays.

Further, data processing systems can be improved if all known solutions are automatically applied, whether or not an issue is identified on a data processing system. Thus, there is a need to apply solutions (e.g., a patch, installing or removing software, changing system settings, etc.) in a proactive and automated manner. Also, there is a need to enable searching of database systems for all files relating to a query file, even if the related files are similar, but not identical to the query file.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "some embodiments," "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

Figure 1:
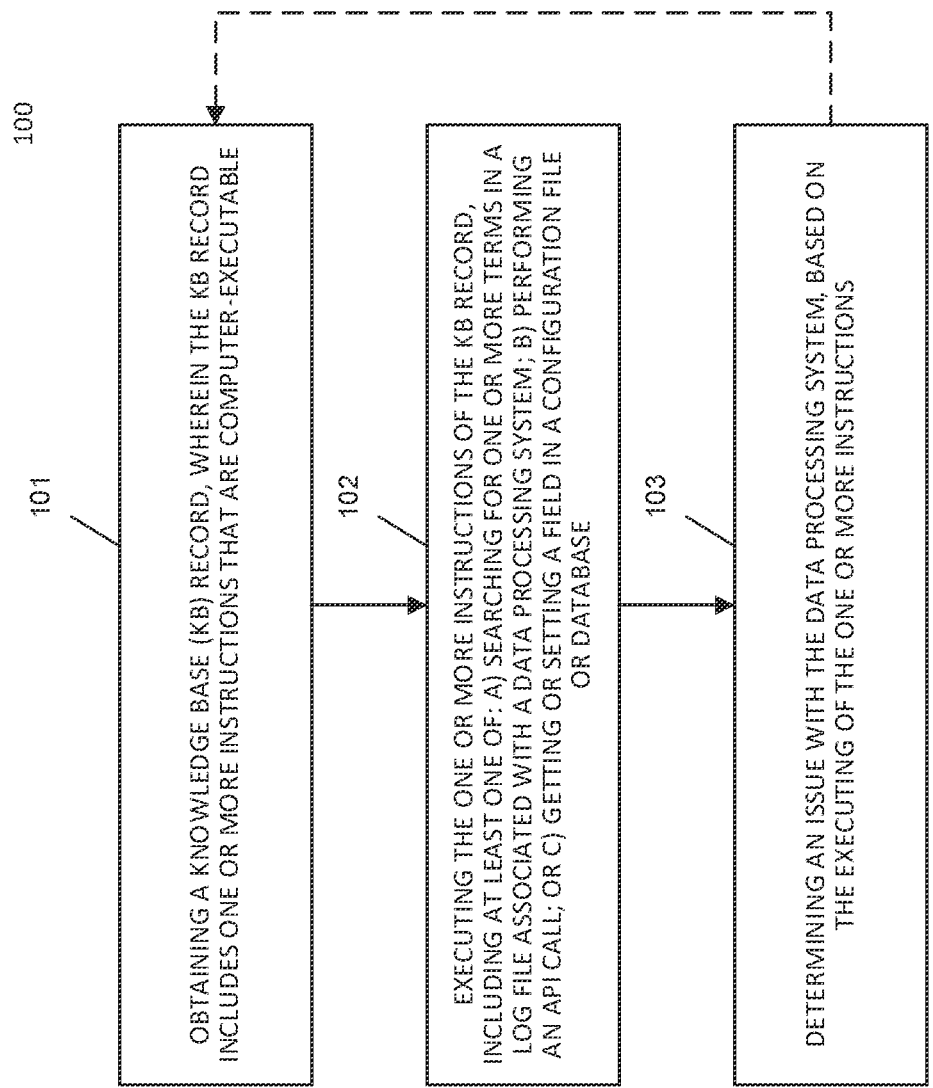
FIG. 1 shows a process for automated support of a data processing system, according to some embodiments.

As shown in FIG. 1, according to some embodiments, a computer-implemented method performs automated and intelligent support for data processing systems. A data processing system can include a computing device such as a networked computer (e.g., a server), a laptop computer, a desktop computer, a mobile device, or other electronic device. Such a method can be performed by the data processing system that is host to the issue (e.g., performing support on itself) or by an external data processing system.

At operation 101, the method includes obtaining a knowledge base (KB) record, wherein the KB record includes one or more instructions that are computer-executable. At operation 103, the method includes executing the one or more instructions of the KB record, including at least one of: a) searching for one or more terms in a log file associated with a data processing system; b) performing an application programming interface (API) call; or c) getting or setting a field in a configuration file or a database. In some embodiments, executing the one or more instructions includes performing at least two of such actions. For example, the KB record can specify which terms to search for, which log file or log files to search for, or which portions of a log file to search. In response to the findings of the log file, an API call can be made to remedy or correct the deficiency, as detected by the log file search. Similarly, the system can get a field in a configuration file or data base and determine that an issues is present. The system can then set a field in the configuration file (e.g., with an API call or through other means) and/or set a field in a data base, as a correction or remedy.

In some embodiments, executing the one or more instructions includes performing one or more API calls to retrieve information or perform an action associated with the data processing system or an application hosted by the data processing system. For example, the instructions can include specific calls to a representational state transfer (REST) API. Using an API call, the method can request information or set information, can make calls to functionality that is specific to hardware or software products, and more.

In some embodiments, the KB record can include logic-based instructions associated with the search results from searching the one or more terms in the log file. This can help determine whether or not a problem is relevant to the data processing system, and what actions to take, if any. For example, a KB file may include instructions with logic such as—if 'X' and 'Y' are present in the log file, then apply patch 'Z' which includes turning off 'Service A', modifying permissions for file 'B', and/or setting a specified field in a configuration file to 'C'.

In some embodiments, the execution of the instructions can include referencing the criteria specified in the instructions that may indicate whether the issue is present. Criteria can include one or more terms in a log file, system level information (e.g., Central Processing Unit (CPU) usage, memory usage, hardware and software versions) settings in configuration files, values returned from API calls, and more.

At operation 103, the method includes determining an issue with the data processing system, based on the executing of the one or more instructions. The issue can be determined based on the instructions in the KB (as discussed) and/or other algorithms that may be applied by the automatic support system.

In some embodiments, in response to when the one or more criteria specified by the KB are satisfied, executing the one or more instructions includes at least one of: deleting or adding a software component, setting a field in configuration file, modifying a permission associated with a user or a digital asset, starting or stopping a service, performing an API call, or communicating an alert to the user. In other words, the KB record can specify the criteria as well as the solution, depending on which criteria is satisfied.

The method can be performed repeatedly, for example, by obtaining a second KB record, a third KB record, and so on. Each KB record can have instructions that follow a common computer-executable format (e.g., a scripting language), so that the automated support system can execute different instructions from different KBs with a common interpreter. Thus, the method can include executing a plurality of KB records, each having computer executable instructions that follow a common scripting language. A scripting or script language is a programming language for a run-time environment. The scripting language can include support for API calls, file searching (e.g., of a log file), shell calls (e.g., 'Bash'), system calls, and other actions taken to get information and/or apply a solution.

Figure 2:
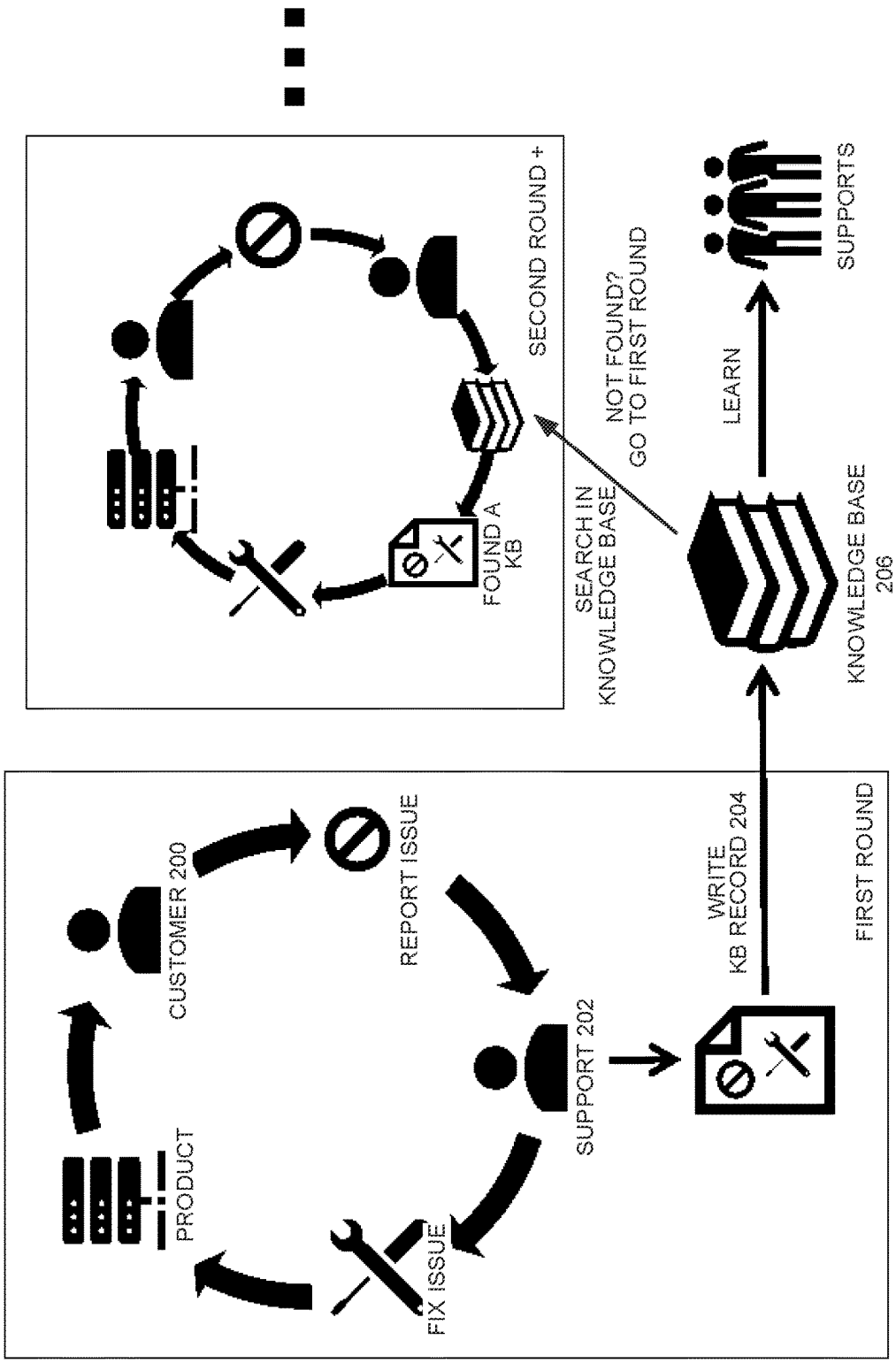
FIG. 2 shows a workflow of support of a data processing system.

FIG. 2 shows an example workflow of support for a data processing system. This workflow relies on human intervention (e.g., a support technician) to retroactively troubleshoot a data processing system and apply a solution. A customer 200 reports an issue associated with a data processing system. A support engineer 202 can observe and troubleshoot the customer's environment, which can include engaging with a developer engineer.

For example, when the issue is investigated, support may determine that this is an environment issue. The support engineer can determine a proper solution to address the issue. Typically, the support engineer authors a KB (knowledge base) record to describe the symptom, the root cause, and the solution or workaround to address the issue. The issue can be marked as 'resolved'. In existing systems, KB records do not contain computer-executable code.

Later when other customers encounter the same or similar issue, other support engineers can manually collect information used for diagnosing the issue, and search through the knowledge base 206 (containing many KB records) to find KB data related to the issue. If these other customers find the same issue, then support can explain the root cause to those customers, and attempt to apply the solution specified in the KB.

Although such a support workflow may work in some instances, this workflow relies heavily on knowledge and experience of the support engineer to understand the user's issue, to know what to search and how to search for it in the KB, and to interpret the information contained in the existing KB records. Embodiments of the method and system described in the present disclosure reduce reliance on the knowledge and experience of the support engineer.

In some embodiments of the present disclosure, a common framework, e.g., a KB-language that is a computer executable language (e.g., a computer script), can be included in each KB record. The executable instructions can describe and diagnose a problem or symptoms thereof, notify users (e.g., a customer and/or support engineer), and/or execute a solution to the problem. An automated support system can process one or more KBs to diagnose and apply solutions in a retroactive or proactive manner.

For example, a backup server may be running with a Linux system. The server can have enabled Rest API support. Further, the backup server can implement a logging system that stores terms (e.g., words, phrases, sentences, values, and other terms) to a log file (e.g., a text-based file with extension '.log'). To digitize the potential issue, a symptom of the issue, and a proper solution, a system and method for automating support can utilize existing features such as the logging system, Rest API, configuration files, service, system and scripting, as illustrated in FIG. 3.

Figure 3:
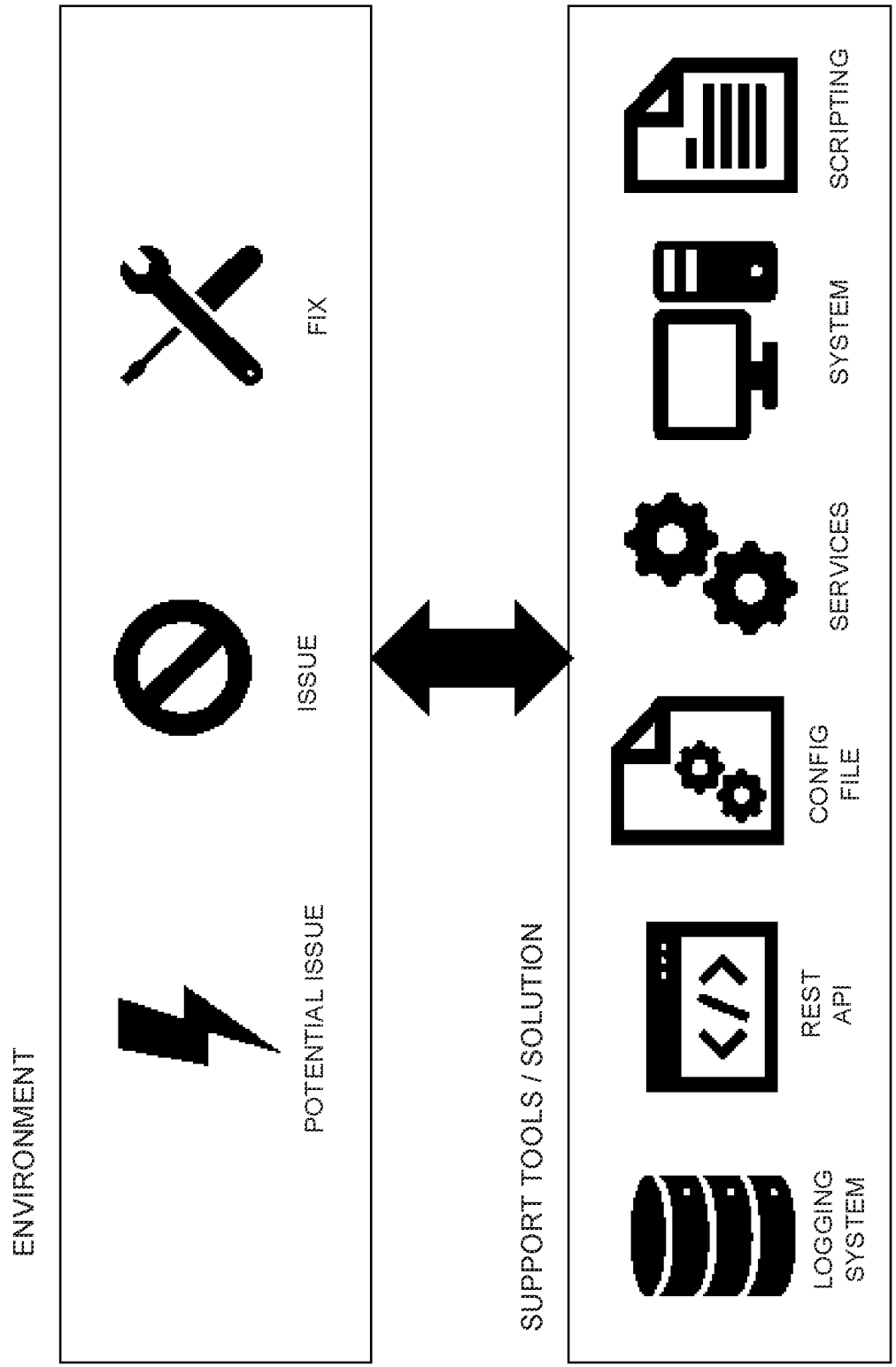
FIG. 3 shows components of automated support for a data processing system, according to some embodiments.

FIG. 3 shows features and components that can be implemented as automated support for a data processing system, according to some embodiments. In a support environment, a user (e.g., a customer) may experience one or more problems with a data processing system. When the issue or potential issue is reported by a customer, the support engineer could gather the information that may indicate the symptoms or source of an issue. A support engineer will gather the log, and find a 'warn' and 'error' log. Such logs are investigated, and the engineer can query the system (e.g., with Rest API), and/or run one or more bash scripts to determine product status.

If a root cause is determined, the support engineer can apply a solution by performing one or more API calls (e.g., REST API), bash scripts, and/or editing some configuration files. In other words, the support engineer's troubleshooting can determine relationships between a) information and status of the data processing system (e.g., system information, hardware, software, services, etc.), b) symptoms, and c) solutions that can be applied as fix. The support engineer can author a KB record that includes one or more computer executable instructions (e.g., a KB-language) where those instructions diagnose the problem and apply the solution that the support engineer discovered as a result of the troubleshooting.

The KB-Language (and/or KB language interpreter) can include support for different features. In some embodiments, the KB-language or interpreter includes one or more execution plugins: e.g. log, rest-api, config-file, services, system and/or bash, which can be used to automatically implement the support tools and solutions shown in FIG. 3. In some embodiments, the language/interpreter includes all such plugins. In some embodiments, the language/interpreter includes string operations such as, for example, 'is', 'contains', 'regular expression', and 'JSONPath'.

Further, the language/interpreter can include support for variables. Variables can be defined, passed in, and passed out of function calls. In some embodiments, variables can be passed in and out of execution of a KB record. For example, a KB record can be executed with an input such as, for example, a date, time, or other value. The KB record can output one or more error codes, a hardware, software list, or other value.

In some embodiments, the language/interpreter includes support for logical expressions, such as 'AND', 'OR', 'NOT', 'IF', 'THEN', 'WHILE', 'FOR', and other logical expressions. A table is shown below to illustrate an example execution plug-in.

TABLE 1

| Plugin | Language expression samples |
| --- | --- |
| log | Log <log-file> <log-level> message<br>Log <log-file> messages contain <msg-1>, then <msg-2>, . . .<br>Log <log-file> messages contain <msg> greater than <n> times within <how-much-time> |
| rest-api | Rest-API <verb> <path> with <body>, response as [code], [body] |
| config-file | Config-file <file> get <key><br>Config-file <file> set <key> with <value-in> |
| services | Service <start | stop | status> <service-name> |
| system | Disk free space less than <x % | y GB><br>Memory free less than <x MB><br>CPU load greater than <x %> |
| bash | Bash run <script>, result as [code], [stdout], [stderr] |

The plugin language can include one or more expressions. The expression can receive one or more parameters, and return one or more results as output. If there is only one result, then the whole expression can be treated as a variable to pass to other expression. In some embodiments, the plugin language may generate rows, e.g. in a log file. This log file can be processed row by row. In such a case, the KB-Language may contain instructions such as shown in the below sample.

TABLE 2

Log 'vmdm.log' 'ERROR' message within '1 hour' contains "some Failure"
Log 'vmdm.log' 'INFO' messages contain "symptom-1", then "symptom-2", then "symptom-3"
Log 'vmdm.log' 'WARN' messages contain "flood-message" greater than '100' times In table 2, samples of instructions relate to the log plug-in, which allows the KB-Language and Interpreter to analyze log files of a data processing system to diagnose possible issues. The first line of instructions specifies to call upon Log 'vmdm.log'. A log file can include different log levels, for example, 'ERROR', 'WARN', and 'INFO', that, by convention, contain different types of information. 'ERROR' can be reserved for failures. 'WARN' can be reserved for information relating to warnings. 'INFO' can be reserved for other information that does not necessarily indicate a failure or a propensity towards failure. In this sample, the first line calls the log plugin to search the 'ERROR' portion of the 'vmdm.log' within '1 hour' that contains "some failure". This first line contains two expressions—a) Log 'vmdm.log' 'ERROR' message within '1 hour', which extracts ERROR messages in the log that are within a specified time frame; and b) searching the extracted messages (in this case ERROR messages within an hour) that contain "some failure".

The second line specifies to call upon Log 'vmdm.log' 'INFO' messages, and searches those results for "symptom-1", then "symptom-2", then "symptom-3". The third line specifies to call upon Log 'vmdm.log' 'WARN' messages, and searches those results to determine whether "flood-message" occurs more than '100' times. This sample illustrates three log expression samples that can be used within the KB-Language and interpreter. It should be understood, however, that in some aspects, human readable expressions can be included and used as KB-language which can then be translated to executable code. The KB-Language is extendable. Further, this sample is meant to be illustrative of some log expressions, rather than limiting.

The KB-Language and interpreter can support string operations which can include string comparisons such as, for example, 'trim', 'substring', 'contains', 'starts with', 'ends with' and 'regular expression'. Such string operations are used to search and manipulate strings. There is also support for advanced string extraction, for example, JSONPath and XPath, which can be used to extract a targeted portion of a structured document.

TABLE 3

REST-API 'GET' '/activities/{id}' , response as rCode, rBody
    rCode is 200
    JSONPath '$..reason' of rBody is "some-reason"

In table 3, a sample of a REST-API call is shown. In this sample, a GET/activities/{id} call is made. The response is stored as 'rCode' which is expected to be 200. String extraction call 'JSONPath' is used to extract the reason portion of the response body, which is expected to be "some-reason".

In some embodiments, the one or more instructions can specify fields of a configuration file or a software registry to 'get' or 'set'. Values of the fields can be retrieved to help diagnose the issue (e.g., as criteria). Setting fields can also remedy an issue. In some embodiments, the one or more instructions specify retrieving system information such as, for example, a total or available disk space, a memory status, a CPU load, a version of an application, a version of an operating system, a list of installed applications, a list of active services, or more. Such information can be used to diagnose the issue (e.g., as criteria).

As described, the KB-Language and interpreter thereof can support variables. Support is present for variable operations such as, for example, define variable, set variable, variable passing to an expression, and result passing (e.g., from an expression out to several variables). For example, using <expression> as <variable>, the output for expression can be passed to a variable.

Further, anonymous variable can be supported when passing a variable from one plugin to build-in operations. There is no need to explicitly set it, e.g. <expression> contains "one-word". Instead, the output from previous expression can be automatically be passed to the second operation. A variable's lifecycle can be the whole execution time of a KB record, or can be preserved by extracting the variable value from the execution of one KB record and using it as input to another KB record. The value can also be stored in persistent memory (e.g., in a record or log).

TABLE 4

Config-file 'sys.conf' get 'mode' is "on-premises"
Define configValue as "on-cloud"
Config-file 'sys.conf' set 'mode' with configValue In table 4, a sample of the KB-Language variable system is shown. In this sample, the executable code 'Config-file 'sys.conf' get 'mode' is "on-premises"' uses an anonymous variable. Config-file 'sys.conf' get 'mode' has an output that is treated as an anonymous variable. This output can be passed into the second expression which is a string comparison '"<variable>" is "a-string"'. In the remainder of the sample, a configValue is defined as "on-cloud" and used to set the mode in the sys.conf file. The result here is that a setting in the configuration file is modified from 'on-premise' to 'on-cloud'.

The KB-Language and interpreter also supports logic expressions, such as, for example, IF, THEN, AND, OR, NOT, FOR, WHILE, and/or other logic expressions. One or more logic expressions can be nested to describe complex issues. These expressions can describe the symptom of the issue or potential issue. For example, KB instructions may specify one or more criteria (e.g., one or more terms in one or more specified log files, system information, configuration settings, etc.) that are investigated. The KB instructions may include logic that determines what issue may be present, based on the criteria.

For example, if all of criteria A, B, and C are met, then this may indicate that the issue is present. In another example, there may more complicated criteria such as, for example, if A, and B are present, and C is not present, then check if D is present, otherwise, if A and C are present, then check for Z. In such a manner, a support engineer's experience and knowledge can be captured in a computer-executable KB record that can be automatically executed.

Figure 4:
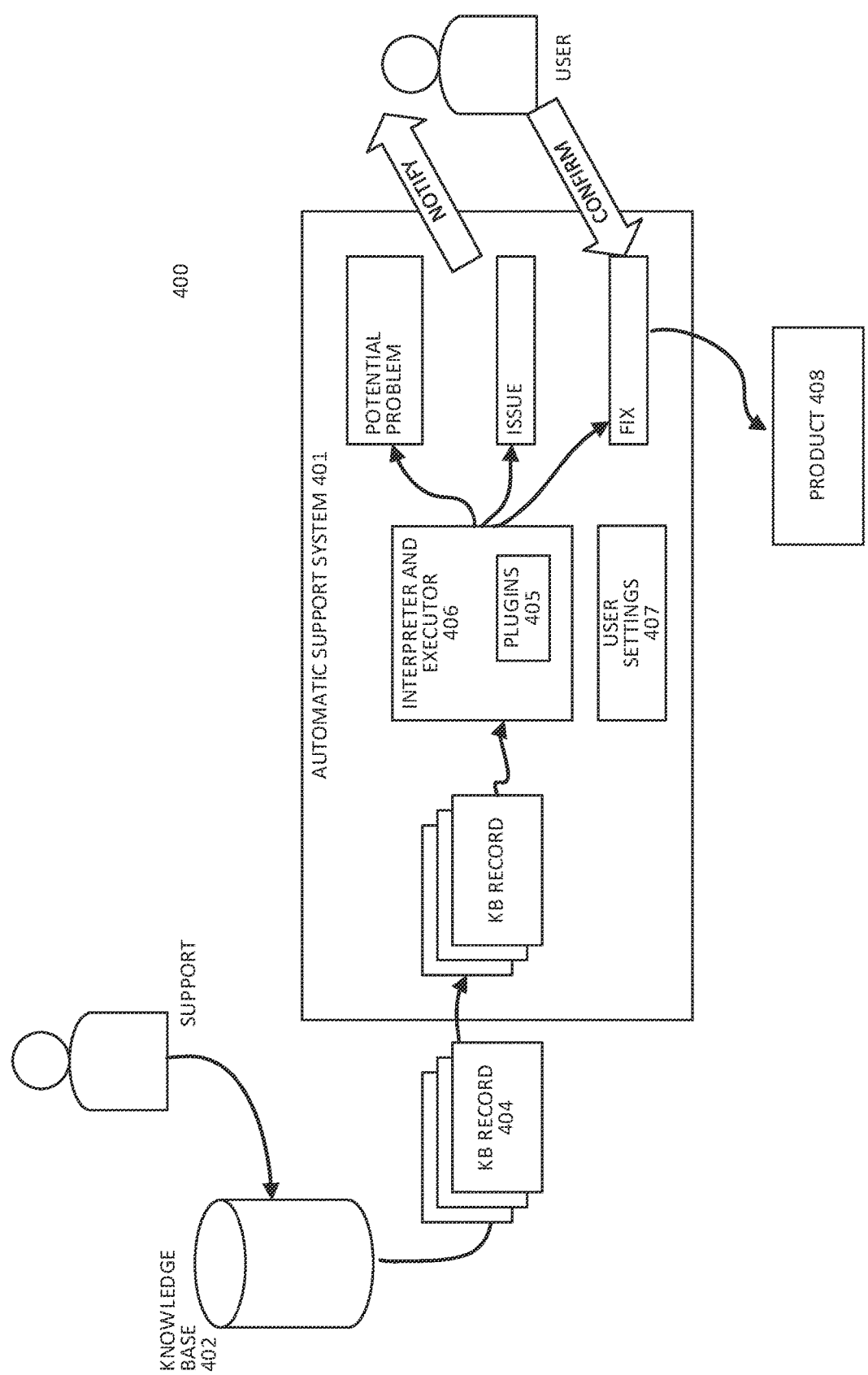
FIG. 4 shows an automatic support system, according to some embodiments.
Figure 5:
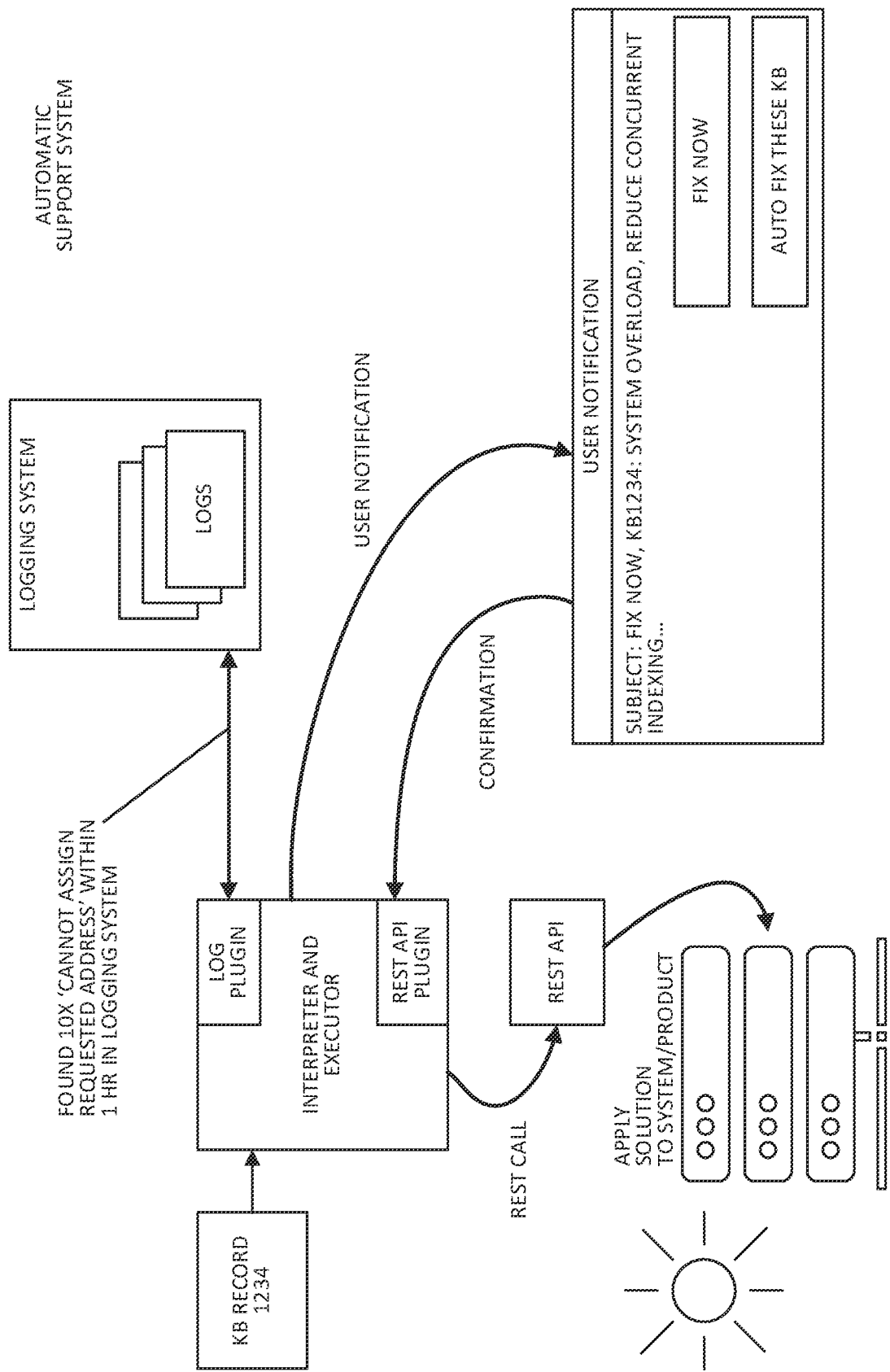
FIG. 5 shows an example workflow with an automatic support system, according to some embodiments.

FIG. 4 shows an automatic support system 401, according to some embodiments. Such a system can perform a method for automated support, such as that shown in FIG. 1. The automatic support system can be hosted by a data processing system (e.g., a server) that is connected to a local or public network. In some embodiments, the automatic support system runs as a subsystem on the same data processing system that it performs diagnostics and applies solutions to. In other embodiments, the automatic support system can run on a separate data processing system as those that it performs diagnostics and applies solutions to. The data processing system can be host to one or more applications such as, for example, a web host, a virtual machine server, an enterprise application, or a backup server.

Although not necessary, the automatic support system can keep internal KB records that are synchronized with KB records 404. Additionally or alternatively, the system can obtain KB records from a KB 402 which can be maintained in a database on a network-connected data processing system (e.g., a server).

more plugins that can pull and search log files, call APIs (e.g., a REST API), get and set fields in a configuration file, start or stop a services, access system information, and run shell commands (e.g., BASH). A plug-in is computer software that can be an add-on or extension that provides functionality without altering the host program itself.

The interpreter and executor can include an interpreter that evaluates the instructions in a KB and then calls upon each plug-in to perform the operation specified by the instruction of the KB, as described in other sections. The interpreter and executor can include additional plug-ins based on the environment. For example, in a MS Windows environment, a plug-in can be added to get and set information in a Windows registry. Thus, the interpreter and executor, as well as the KB-language, is extendable.

In some embodiments, based on whether or not one or more specified criteria is satisfied, the system can determine that a problem or potential problem is found. In some embodiments, the system can notify a user (e.g., through an email or electronic alert message). For example, the system can cause a notification to surface on a user interface device such as a tablet computer, a mobile device, or a screen of a desktop or laptop. The notification can include a request for the user to confirm action. When the user confirms, then the system can apply a fix to the product.

In some embodiments, the fix can be applied automatically, without requiring confirmation. Whether or not the system provides a notification or requests confirmation can be dependent on one or more fields in user settings 407. In some embodiments, the automatic support system can be configured to process KB records (which can include applying one or more solutions) in a scheduled manner. For example, the KB records can be processed daily to run at specific times. In some embodiments, the system runs daily at off-peak time, so that the impact on product performance is reduced. In some embodiments, the system is scheduled to run hourly, for example, if a user wishes to monitor the system with tight control. The user can include a customer, technical support, or other user.

A sample KB record with computer-executable instructions is shown below in Table 5.

TABLE 5

| KNOWLEDGE BASE RECORD 1234 |
| --- |
| Title: "System is overload, reduce concurrent indexing task to resolve it"<br>Issue:<br>   Log 'index.log' 'ERROR' messages contains 'Cannot assign requested address' greater than '10' times within '1 hour'<br>Notify:<br>   Customer, Support Engineer<br>Fix:<br>   Rest-API 'PATCH' '/api/v2/config' with '{"concurrentIndexTasks": 5}', response as rCode<br>     rCode is 200 |

Each KB record can be evaluated one by one to determine whether an issue similar to that identified in the KB record is present in a data processing system. The issue can be related to one or more products 408 that, as mentioned, can reside on the same or different data processing system as the automatic support system.

The interpreter and executor 406 can process each KB record to interpret and execute the instructions therein. The interpreter and executor can include one or more plugins 405 to access the support tools and solutions shown in FIG. 3. For example, the interpreter and executor can include one or In this example, a customer may have reported numerous indexing errors. A support technician may have investigated the customer environment and found that many ERROR logs contain terms such as 'Cannot assign requested address—connect(2) for \"127.0.0.1\" port 9200 (127.0.0.1: 9200)'. After consulting with an engineer, the support technician could have determined that the problem relates to an 'Elasticsearch' overload. Further, troubleshooting revealed that if the concurrent index task count is reduced, this mitigates or resolves this issue.

The support technician, engineer, or other user authored KB record 1234 that includes computer executable instructions that identifies symptoms and, if such symptoms are present, applies a solution.

In some embodiments, the KB-1234 can be stored in the KB database with product name, product version, and the KB content. Automatic support systems can search the KB database for product versions that match products that they are responsible for supporting. Each system can retrieve this KB-1234 and interpret and execute the instructions therein. In such a manner, the system can determine if an ERROR log contains "Cannot assign requested address", e.g. over 10 times. If yes, then the system can send the notification to a user to request for confirmation of whether or not to apply the fix. When customer provides confirmation (e.g., pressing a button labeled 'fix now') the system can execute the fix described in the KB record. In this case, the solution includes calling a REST-API, path config with concurrentIndexTasks, and setting the concurrentIndexTasks field to 5.

Figure 6:
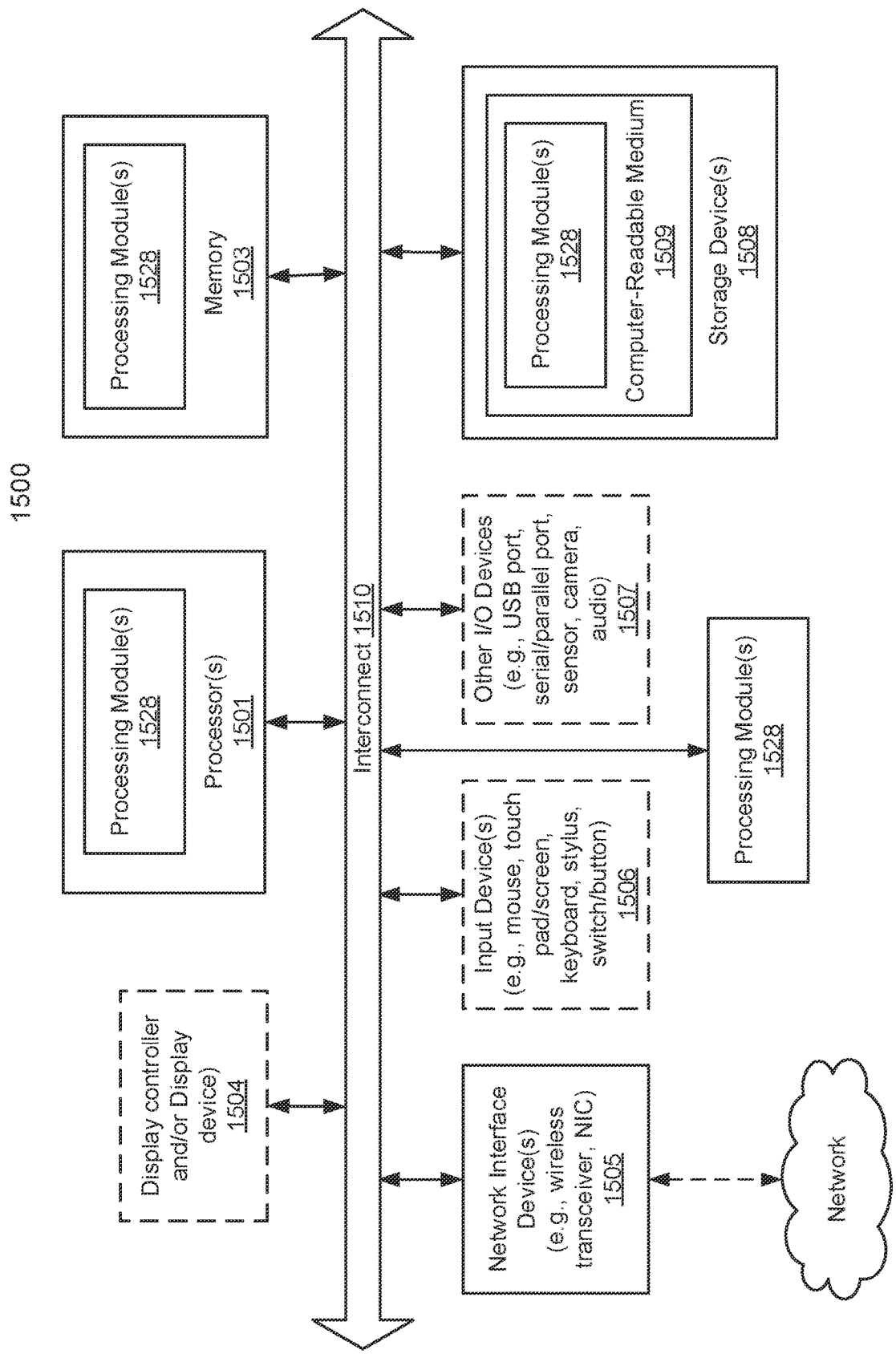
FIG. 6 shows an example data processing system, according to some embodiments.

The workflow of the example above can be illustrated in FIG. 6. The KB record 1234 is processed by the interpreter and executor to interpret and execute the instructions of the record. The login plugin can access and search logs in the logging system to determine whether the specified term is found 10 times within 1 hour. If yes, then a notification is sent to the user. The user confirms to perform the fix. The rest API plugin accesses a REST API call to apply the solution, which in this case, sets the concurrentIndexTasks field of a configuration file to '5'. The product and data processing system can return to 'green' status, meaning that operations are as intended. As mentioned, however, rather than send the notification requesting confirmation, the system can automatically apply the fix.

In some embodiments, telemetry data can be collected. For example, the frequency that each KB occurs in each customer. User response such as, for example, whether a customer clicked the "Fix Now" button can be collected. The telemetry information can be useful when considering the design of the automatic support system.

FIG. 6 shows an example data processing system, according to some embodiments. This example data processing system, which can be described as a computing system, may be used in conjunction with one or more embodiments of the disclosure.

For example, system 1500 may represent any of data processing systems described above performing any of the processes or methods described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of configuration 100 (e.g. risk management manager 106, deduplication logic 107, etc.). Processing modules 1528 may also reside, completely or at least partially, within memory 1503 and/or within processor 1501 during execution thereof by system 1500, memory 1503, and processor 150, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method performed by a computing device, comprising:
   obtaining, by the computing device, a knowledge base (KB) record, wherein the KB record includes one or more instructions that are computer-executable, including a first instruction for searching a log file for a threshold number of occurrences of one or more criteria within a specified duration, and a second instruction to perform a representational state transfer application programming interface (REST-API) call with one or more specified parameters;
   executing, by the computing device, the one or more instructions of the KB record including searching for the one or more criteria in the log file associated with a data processing system; and
   in response to detecting a number of occurrences of the one or more criteria in the log file within the specified duration, performing the REST-API call with the one or more specified parameters is a patch.

2. The method of claim 1, wherein the first instruction of the one or more instructions includes to search for a first of the one or more criteria in the log file, and in response to finding the first of the one or more criteria, to search for a second of the one or more criteria in the log file.

3. The method of claim 1, wherein the one or more instructions comprise a variable passed from one of the one or more instructions to another of the one or more instructions.

4. The method of claim 3, wherein the one or more instructions comprise modifying a permission associated with a user or a digital asset.

5. The method of claim 1, wherein the one or more instructions include retrieving system information of the data processing system including at least one of: a disk space, a memory status, a Central Processing Unit (CPU) load, a version of an application, a version of an operating system, a list of installed applications, or a list of active services.

6. The method of claim 1, wherein the one or more instructions include getting or setting a field in a software registry.

7. The method of claim 1, wherein the one or more instructions include deleting or adding a software component.

8. The method of claim 1, further comprising:
   obtaining additional KB records, and executing one or more instructions of the additional KB records; and
   determining an issue with the data processing system based on results from both the executing of the one or more instructions of the additional KB records and the executing of the one or more instructions of the KB record.

9. A non-transitory computer-readable medium storing instructions which, when executed by one or more processors of a computing device, cause the computing device to perform operations comprising:
   obtaining, by the computing device, a knowledge base (KB) record, wherein the KB record includes one or more instructions that are computer-executable, including a first instruction for searching a log file for a threshold number of occurrences of one or more criteria within a specified duration, and a second instruction to perform a representational state transfer application programming interface (REST-API) call with one or more specified parameters;
   executing, by the computing device, the one or more instructions of the KB record, including searching for the one or more criteria in the log file associated with a data processing system; and
   in response to detecting a number of occurrences of the one or more criteria in the log file within the specified duration, performing the REST-API call with the one or more specified parameters as a patch.

10. The non-transitory computer-readable medium of claim 9, wherein the first instruction of the one or more instructions includes to search for a first of the one or more criteria in the log file, and in response to finding the first of the one or more criteria, to search for a second of the one or more criteria in the log file.

11. The non-transitory computer-readable medium of claim 9, wherein the one or more instructions comprise a variable passed from one of the one or more instructions to another of the one or more instructions.

12. The non-transitory computer-readable medium of claim 11, wherein the one or more instructions comprise deleting or adding a software component.

13. The non-transitory computer-readable medium of claim 9, wherein the one or more instructions include retrieving system information of the data processing system including at least one of: a disk space, a memory status, a Central Processing Unit (CPU) load, a version of an application, a version of an operating system, a list of installed applications, or a list of active services.

14. The non-transitory computer-readable medium of claim 9, wherein the one or more instructions include getting or setting a field in a software registry.

15. A data processing system, comprising:
computer-readable memory; and
a processor that executes instructions stored on the computer-readable memory, causing the data processing system to perform operations including:
obtaining, by the processor, a knowledge base (KB) record, wherein the KB record includes one or more instructions that are computer-executable, including a first instruction for searching a log file for a threshold number of occurrences of one or more criteria within a specified duration and a second instruction to perform a representational state transfer application programming interface (REST-API) call with one or more specified parameters;
executing, by the processor, the one or more instructions of the KB record, including searching for the one or more criteria in the log file associated with the data processing system; and
in response to detecting a number of occurrences of the one or more criteria in the log file within the specified duration, performing the REST-API call with the one or more specified parameters as a patch.

16. The data processing system of claim 15, wherein the first instructions of the one or more instructions includes to search for a first of the one or more criteria in the log file, and in response to finding the first of the one or more criteria, to search for a second of the one or more criteria in the log file.

17. The data processing system of claim 15, wherein the one or more instructions comprise a variable passed from one of the one or more instructions to another of the one or more instructions.

18. The data processing system of claim 17, wherein the one or more instructions comprise communicating an alert to a user.

19. The data processing system of claim 15, wherein the one or more instructions include retrieving system information of the data processing system including at least one of: a disk space, a memory status, a Central Processing Unit (CPU) load, a version of an application, a version of an operating system, a list of installed applications, or a list of active services.

20. The data processing system of claim 15, wherein the one or more instructions include getting or setting a field in a software registry.

* * * * *